Patented July 27, 1954

2,684,983

UNITED STATES PATENT OFFICE 2,684,983

PROCESS FOR MODIFYING PROTEIN HYDROLYSATE SOLUTIONS

Ernest B. McQuarrie, Concord, Calif., assignor to Cutter Laboratories, Berkeley, Calif., a corporation of California No Drawing. Application September 2, 1952, Serial No. 307,560

5 Claims. (Cl. 260—529)

This invention relates to a process of treating protein hydrolysate solutions which are to be used in the preparation of therapeutic solutions for intravenous feeding. The term "protein hydrolysate," as used herein, means the products of hydrolysis of proteins whether the proteins are hydrolyzed by enzymes, or acids, or other common means.

It is now known that the dicarboxylic amino acids, specifically the glutamic and aspartic acids, are responsible for many of the undesirable reactions which often occur during the intravenous administration of protein hydrolysate solutions. More specifically, the dicarboxylic amino acids, when administered intravenously at too rapid a rate, are known to cause nausea and vomiting in the patient receiving the infusion of protein hydrolysate. These reactions are most unpleasant and in many cases are very harmful to the nutritional state of the patient. It is desirable, therefore, that protein hydrolysate solutions intended for intravenous administration should contain a reduced concentration of these dicarboxylic amino acids.

One of the objects of this invention is the provision of an ion exchange method for removing the dicarboxylic amino acids from protein hydrolysate solutions which are to be used for parenteral alimentation, while preserving adequate amounts of the various physiologically essential amino acids, especially phenylalanine.

A further object of this invention is the provision of a method for removing ammonia from protein hydrolysate solutions.

More specifically, the object of this invention is the provision of a process for removing ammonia and dicarboxylic amino acids from protein hydrolysate solutions wherein: such solutions are reacted with an anion exchange resin in the alkali regenerated form; the resulting effluent is freed of ammonia by evaporation and then diluted with water and wherein the diluted effluent is again reacted with an anion exchange resin to effect a selective deposition of dicarboxylic amino acids on the resin.

There are two old methods which may be used to remove the dicarboxylic amino acids from protein hydrolysate solutions, but, as will be pointed out subsequently, these methods are either uneconomical or too impractical.

Olcott and Lewis, United States Patent 2,434,715, removed glutamic acid from protein hydrolysate solutions by heating the solution at pH 3 to such an extent as to convert the glutamic acid to its lactam (pyrrolidone carboxylic acid). The lactam is then removed from solution by solvent extraction. However, some of the other amino acids are harmed by this heating procedure and the process was not intended to be applied to protein hydrolysate solutions intended for complete parenteral alimentation.

Howe and Tishler, United States Patents 2,457,820 and 2,480,654, devised a method for preparing a protein hydrolysate solution with a substantial removal of the dicarboxylic amino acids. This method consists of completely hydrolyzing the protein with acid, adjusting the pH to 5.4 and extracting the neutral amino acids (monoamino, mono-carboxylic amino acids) with butanol, recovering the extracted amino acids by evaporation of the butanol, passing the extracted aqueous hydrolysate solution through a cation exchange column to remove the basic amino acids onto the column, discarding the dicarboxylic amino acids which passed through the column, recovering the basic amino acids from the cation exchanger by elution with aqueous ammonia, evaporating the eluate to recover the basic amino acids, and combining the neutral and basic amino acids to form the desired protein hydrolysate solution.

The use of the anion exchangers to remove the dicarboxylic amino acids from protein hydrolysate solutions has been studied by numerous investigators. Cannan, Journal of Biological Chemistry, 152, 401 (1944) studied the removal of the glutamic acids from protein hydrolysates by the use of weak anion exchangers. By repeated extractions with the weak anion exchange resin the glutamic acid was removed from protein hydrolysate solutions provided the solutions did not contain high concentrations of basic amino acids. For those solutions high in basic amino acids Cannan first employed phosphotungstic acid precipitation to remove the basic amino acids prior to the treatment with resin.

Most protein hydrolysate solutions will contain a sufficiently high concentration of basic compounds (basic amino acids and ammonia formed during hydrolysis) to make the weak anion exchangers unsuitable for the removal of the dicarboxylic amino acids. That is, these exchangers are not sufficiently strong cations to compete with the basic cations for the dicarboxylic amino acids, and, as a result, a satisfactory removal of these acid amino acids cannot be obtained.

Strong anion exchangers (quaternary amine types) are sufficiently strong cations to effect a removal of the dicarboxylic amino acids from protein hydrolysate solutions. However, when these protein hydrolysate solutions containing appreciable quantities of basic compounds, such as a casein hydrolysate, are passed through a bed of a strong anion exchanger of sufficient size to cause a suitable removal of the dicarboxylic amino acids, it is found that an excessive loss of phenylalanine occurs.

In accordance with the present invention, a suitable removal of the dicarboxylic amino acids from a protein hydrolysate solution can be effected without any appreciable loss of phenylalanine by the use of anion exchange resins. In general, according to this invention, glutamic and aspartic acids in a neutralized hydrolysate solution are removed from the solution by the following operations: the solution is passed downward through a bed of a strong anion exchange resin, or an intermediate anion exchange resin, in the hydroxyl form until the total effluent collected has a hydrogen ion concentration of pH 8.0 to 8.8. The actual hydrogen ion concentration which should be obtained will depend on the particular protein hydrolysate solution being treated. In no case should the pH end point be greater than 8.8, as at pH values above 8.8 the phenylalanine will be absorbed on the anion exchange resin and will be lost. For protein hydrolysate solutions low in basic amino acids and ammonia, an end point closer to pH 8.0 can be used. After the proper amount of protein hydrolysate solution has been added to the anion exchanger, the exchanger bed is washed well with water. The combined effluent and wash is reduced either to a dry powder by any method which will not destroy any of the amino acids, for example, spray drying, or is reduced to a low volume concentrated solution by evaporation under vacuum and heat, either method serving to remove most of the ammonia from the protein hydrolysate solution. The dried or concentrated protein hydrolysate is dissolved in or diluted with water and the resulting solution is clarified by filtration. The clarified solution is then again passed through an anion exchange bed as described above.

Again the actual pH end point which should be attained will depend on the particular protein hydrolysate being treated. In no case, however, should the end point be above pH 8.6 or below pH 7.5. The column is again washed well with water and the combined effluent and wash will consist of a protein hydrolysate from which the major portion of the glutamic and aspartic acids have been removed, and which will contain physiologically adequate amounts of phenylalanine. This solution after adjustment and decoloration, is suitable for use as a source of nitrogen in intravenous alimentation.

It is extremely important to avoid the loss of any phenylalanine during the preparation of a protein hydrolysate intended for use in nutrition. Phenylalanine is not only an amino acid which is indispensable for man, but in addition it is present in natural proteins only slightly in excess of man's minimum requirements. It is imperative, therefore, that ammonia be removed from the protein hydrolysate solution prior to the removal of dicarboxylic acids on an anion exchange resin.

A great variety of anion exchange resins are available commercially and these vary widely in their strength or affinity for removing anions. These various resins can be classified roughly as weak, intermediate, and strong, although some are available which in a sense are a mixture of intermediate and strong. An anion exchange resin which would be classified as weak is not suitable for the removal of dicarboxylic acids from a mixture of the other amino acids. An anion exchange resin which is either intermediate or strong is suitable for removal of the dicarboxylic amino acids provided the ammonia is first removed in accordance with this invention. An example of a particular commercially available intermediate anion exchange resin which is entirely suitable for use in this invention is a resin known as Duolite A-70, which is a brand name of a resin manufactured by the Chemical Process Company, Redwood City, California, and described by the manufacturer as a "polyamine resin crosslinked to result in a product of intermediate basicity."

The following example describes a preferred process for carrying out the present invention. It should be understood that there is a certain latitude in the choice of resins, and in the actual pH values attained at various stages due to the minor differences between resins, and due to the differences in amino acid composition of hydrolysates from various proteins.

Casein is hydrolyzed by any common means which does not destroy the amino acids and is hydrolyzed to such an extent that the dicarboxylic amino acids are set free and are not combined in the form of peptides or polypeptides. Adequate directions for performing such an hydrolysis are available in the literature.

A neutralized solution of an hydrolysate of casein containing 12 mg. of nitrogen per ml. is passed downward through a 6 inch diameter column of 10 liters of an intermediate anion exchange resin (for example, Duolite A-70) in the hydroxyl (alkali regenerated) form until the total effluent is pH 8.65. About 24 liters of solution is required. The column is then washed with about 20 liters of water. The combined effluent and wash is dried by spray drying. The combined solution is added to the spray drier at such a rate that when the influent gas temperature is 500° F., the effluent gas temperature is kept between 145° and 155° F. About 1.3 kilograms of dried amino acids free of ammonia is obtained. The dried material is dissolved by stirring for one hour in about 13 liters of distilled water. The solution is clarified by filtration and is then passed downward through a three liter Duolite A-70 column until the total effluent is pH 8.2. The column is then washed with about 6 liters of water and the effluent and wash are combined.

The amino acids of the casein hydrolysate solution originally contained 29.6 per cent of dicarboxylic acids and about 4.0 per cent of phenylalanine. After completion of the above process the amino acids contained only 11 per cent of dicarboxylic acids and 3.5 per cent of phenylalanine. Thus, two-thirds (⅔) of the clinically objectionable dicarboxylic amino acids were removed with only a minimal loss of phenylalanine.

Having thus described my invention, what I claim and desire to secure by Letters Patent is:

1. A process for treating protein hydrolysate solutions containing dicarboxylic amino acids, basic amino acids, and ammonia and phenylalanine comprising: reacting the protein hydrolysate solution with an anion exchange resin in the alkali regenerated form, removing the ammonia from the protein hydrolysate by evaporation, diluting the evaporated protein hydrolysate with water, and again reacting the diluted protein hydrolysate with an anion exchange resin to effect a substantial removal of the dicarboxylic amino acids onto the resin without appreciable removal of phenylalanine onto the resin.

2. A process for treating protein hydrolysate solutions containing dicarboxylic amino acids, basic amino acids and ammonia and phenylalanine comprising: passing the protein hydrolysate solution through a bed of an anion exchange resin in the alkali regenerated form until the total effluent is pH 8.0 to pH 8.8, removing the ammonia from the protein hydrolysate solution by evaporation, diluting the evaporated protein hydrolysate with water, and passing the diluted protein hydrolysate solution through an anion exchange resin in the alkali regenerated form until the total effluent is pH 7.5 to pH 8.6.

3. A process for treating protein hydrolysate solutions containing dicarboxylic amino acids, basic amino acids and ammonia and phenylalanine comprising: passing the protein hydrolysate solution through a bed of an anion exchange resin in the alkali regenerated form until the total effluent is pH 8.0 to pH 8.8, removing the ammonia from the protein hydrolysate solution by evaporation to dryness, dissolving the dried protein hydrolysate in water, and passing the resulting protein hydrolysate solution through an anion exchange resin in the alkali regenerated form until the total effluent is pH 7.5 to pH 8.6.

4. A process for treating protein hydrolysate solutions containing dicarboxylic amino acids, basic amino acids and ammonia and phenylalanine comprising: reacting the protein hydrolysate solution with an anion exchange resin in the alkali regenerated form and washing the resin with water and combining the effluent and wash, removing the ammonia by evaporation from the protein hydrolysate solution, diluting the evaporated protein hydrolysate with water, and passing the diluted protein hydrolysate solution through an anion exchange resin in the alkali regenerated form until the total effluent is pH 7.5 to 8.6 and washing the resin with water and combining the effluent and wash.

5. A process for treating protein hydrolysate solutions containing dicarboxylic amino acids, basic amino acids, and ammonia and phenylalanine comprising: reacting the protein hydrolysate solution with an anion exchange resin in the alkali regenerated form and washing the resin with water and combining the effluent and wash water, removing the ammonia from the protein hydrolysate solution by evaporation to dryness, dissolving the dried protein hydrolysate in water, and passing the resulting protein hydrolysate solution through an anion exchange resin in the alkali regenerated form until the total effluent is pH 7.5 to pH 8.6 and washing the resin with water and combining the effluent and wash.

References Cited in the file of this patent

UNITED STATES PATENTS

| Number | Name | Date |
|---|---|---|
| 2,180,637 | Kemmerer | Nov. 21, 1939 |
| 2,470,955 | Sahyun | May 24, 1949 |
| 2,556,907 | Emmick | June 12, 1951 |
| 2,590,209 | Roberts | May 25, 1952 |

OTHER REFERENCES

Cannan, J. Biol. Chem. vol. 152, pages 401–2 (1944).

Cleaver et al., J. Am. Chem. Soc., vol. 67, pages 1343–52 (1945).

Kunin et al., "Ion Exchange Resins" (Wiley), pages 66–69 (1950).